United States Patent [19]
Lebby et al.

[11] Patent Number: 5,469,185
[45] Date of Patent: Nov. 21, 1995

[54] REMOTE SENSORY UNIT AND DRIVER

[75] Inventors: Michael S. Lebby, Chandler; Karen E. Jachimowicz, Goodyear, both of Ariz.

[73] Assignee: Motorola, Inc., Schaumburg, Ill.

[21] Appl. No.: 105,664

[22] Filed: Aug. 13, 1993

Related U.S. Application Data

[63] Continuation of Ser. No. 844,072, Mar. 2, 1992, abandoned.

[51] Int. Cl.⁶ .................................. G09F 9/35; G02B 6/00
[52] U.S. Cl. .................. 345/8; 345/32; 345/207; 340/815.42; 359/630; 385/133
[58] Field of Search .......................... 340/705, 815.42; 359/630, 151, 152, 13, 15, 572, 566; 345/7, 8, 9, 204, 211, 207, 32; 385/133, 146, 147, 901

[56] References Cited

U.S. PATENT DOCUMENTS

| | | | |
|---|---|---|---|
| 4,743,200 | 5/1988 | Welch et al. | 340/705 |
| 4,897,715 | 1/1990 | Beamon, III | 340/705 |
| 5,003,300 | 3/1991 | Wells | 340/705 |
| 5,072,209 | 12/1991 | Hori et al. | 340/705 |
| 5,155,615 | 10/1992 | Tagawa | 340/705 |
| 5,159,479 | 10/1992 | Takagi | 359/152 |

FOREIGN PATENT DOCUMENTS 2149554  6/1985  United Kingdom .

*Primary Examiner*—Tommy P. Chin
*Assistant Examiner*—Kara A. Farnandez
*Attorney, Agent, or Firm*—Eugene A. Parsons

[57] ABSTRACT

A remote sensory unit, including any of a display, earphones and a microphone, connected to a driver by an optical link. The remote sensory unit is active, passive, or some combination of the two. Active sensory units are powered by solar cells, batteries, power transmitted through the optical link, or a combination thereof.

6 Claims, 3 Drawing Sheets

REMOTE SENSORY UNIT AND DRIVER

This application is a continuation of prior application Ser. No. 07/844,072, filed Mar. 2, 1992, now abandoned.

The present invention pertains to remote sensory units and electronic drivers and more specifically to remote displays and interconnects for reducing the size and complexity thereof.

BACKGROUND OF THE INVENTION

In general, remote displays are controlled by a driver which communicates with the display by means of an electrical cable. Because electrical cables are subject to interference signals and other radiation, it is necessary to shield the cable from this outside interference. Further, the display must contain a light source or other electronics for creating a display and circuitry for receiving control signals from the driver and converting them to useable information in the display. All of this apparatus, along with the connecting cable, is relatively heavy, expensive and inconveniently complicated.

In many remote displays, and especially head-mounted displays, weight, size and expense are major factors. There is a substantial need for displays that are light, small and inexpensive.

SUMMARY OF THE INVENTION

It is a purpose of the present invention to provide an extremely light and convenient remote sensory unit.

It is a further purpose of the present invention to provide a sensory unit that is easily and conveniently head-mounted.

The above purposes, needs and others are met by a remote sensory unit and driver including a remote visual display having input means for receiving optical signals and converting the optical signals to a visual image, an interconnect including an optical fiber having first and second ends, the first end being attached to the visual display, and a driver having optical outputs with the second end of the interconnect attached thereto, the driver providing operating signals to the display by way of the interconnect when the driver is energized.

BRIEF DESCRIPTION OF THE DRAWINGS

Referring to the drawings.

DESCRIPTION OF THE PREFERRED EMBODIMENT

Figure 1:
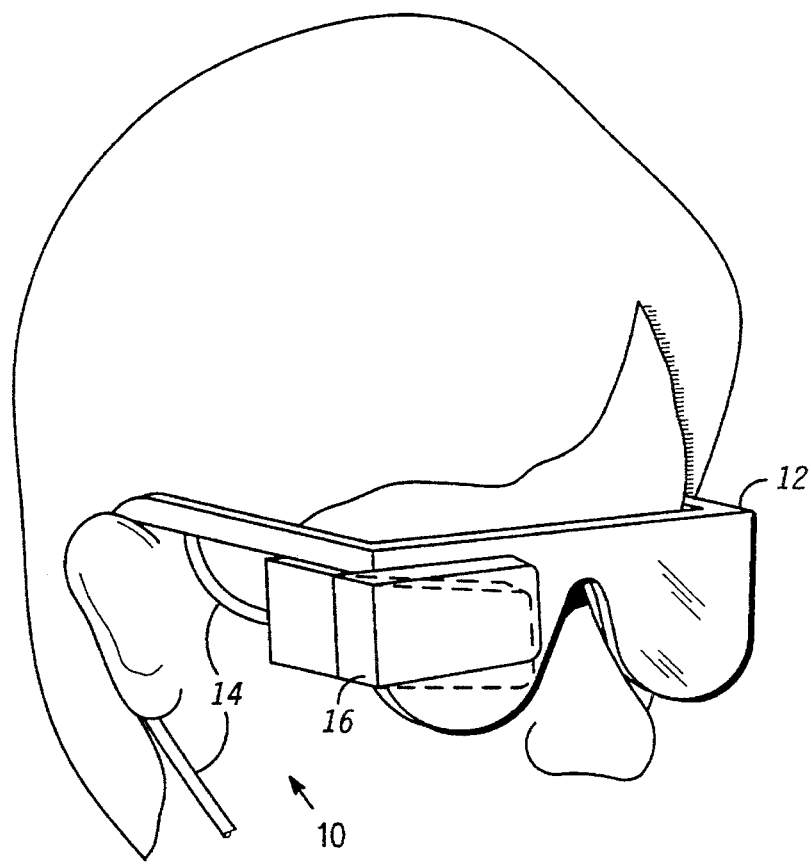
FIG. 1 is a view in perspective of a head-mounted remote display incorporating the present invention.
Figure 2:
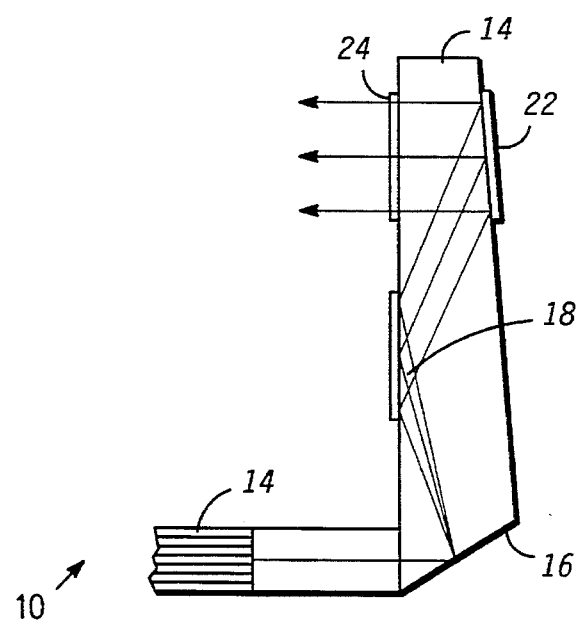
FIG. 2 is a view in top plan of the head mounted remote display of FIG. 1.

Referring specifically to FIGS. 1 and 2, a remote display 10 incorporating the present invention is shown in perspective. Display 10 is head-mounted by means of a frame 12 similar to, or actually incorporated into, a frame for eye glasses. Frame 12 provides convenient head mounting for display 10 so that hands-free viewing is accomplished. Display 10, in this specific embodiment, is a combination of features selected to provide the most convenient shape. One end of an elongated bundle 14 of optical fibers is affixed to an optical waveguide 16 and the other end (not shown) is operatively attached to display generating apparatus in a remote driver. Bundle 14 provides a real image generally perpendicular to the side of optical waveguide 16. Light rays travel along an optical path including a reflecting surface 18, a diffraction lens 20, which magnifies the image, a second diffraction lens 22, which provides additional magnification of the image, and a final diffractive optical element 24, which defines an aperture for viewing the resulting magnified virtual image.

Additional information on the operation and possible different embodiments of display 10 are disclosed in a U.S. Pat. No. 5,224,198, entitled "WAVEGUIDE VIRTUAL IMAGE DISPLAY", issued Jun. 29, 1993, and assigned to the same assignee. In this patent application a plurality of virtual image displays are disclosed which are small enough to be conveniently head-mounted. Further, small real image generators are disclosed which are utilized in remote display 10 to generate an image for transmission by bundle 14. These small real image generators are controlled in a well known fashion by electronic signals within the driver.

Bundle 14 of optical fibers is a very fine and very light bundle which is simply incorporated into the ear piece of frame 12 so as to extend downwardly behind the ear. Further, frame 12 and display 16 are constructed extremely light so that the entire display weighs little more than a pair of eye glasses. In fact, in this specific embodiment, display 16 is constructed so that it can be pivoted out of the field of view of the operator and standard eye glasses can be used in frame 12. When it is desired to use display 16 it is simply pivoted back into the field of view.

Figure 3:
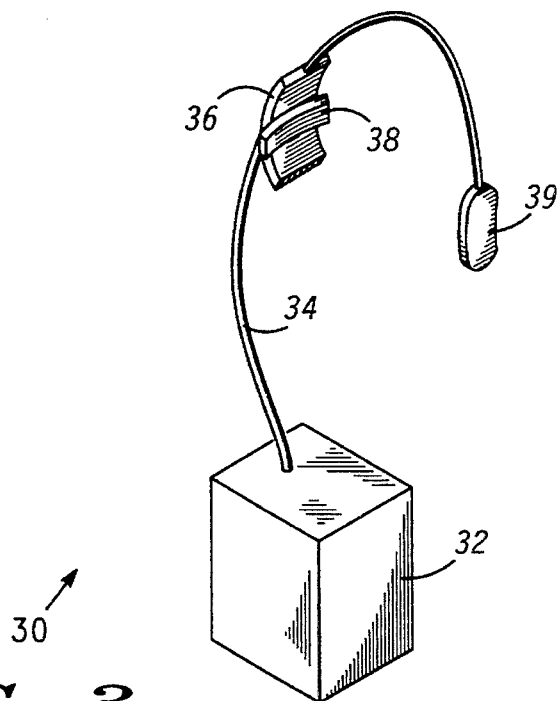
FIG. 3 is a view in perspective of a remote sensory unit and driver incorporating the present invention.

Referring specifically to FIG. 3, a remote sensory and driver unit 30 incorporating the present invention is illustrated. Unit 30 includes a driver 32, adapted to be carried in a pocket or on the belt of an operator, an interconnect 34 and a sensory unit 36. In this specific embodiment, sensory unit 36 includes visual display 38 and earphones 39. Driver 32 includes the major power source and apparatus for generating signals required to drive sensory unit 36. Driving signals, in this embodiment, include electrical signals for generating and controlling visual display 38 to produce desired visual information, which may be alpha-numeric characters and/or pictures, and electrical signals for driving earphones 39 to produce desired audible information.

In this specific embodiment interconnect 34 is a few optical fibers, in some applications as few as one, one end of which are attached to transducers in driver 32 and the other end of which are attached to sensory unit 36. The one end of interconnect 34 is attached to driver 32 by transducers, such as lasers, which receive electrical signals and convert them to light. The other end of interconnect 34 is attached to sensory unit 36 by means of transducers, such as photo diodes, which receive the light and convert it back to electrical signals. Because transmission of light signals through interconnect 34 is extremely fast and efficient (concepts such as time-sharing are easily incorporated) a very small number of optical fibers are required to carry large amounts of information. Further, outside interference does not disrupt the signals so that there is less chance of data errors in unit 30.

By utilizing concepts of marrying optical fibers to transducers similar to those described in a copending application entitled "SEMICONDUCTOR TO OPTICAL LINK AND METHODS OF FORMING", having Ser. No. 07/844,027, filed of even date herewith and assigned to the same assignee, and a copending application entitled "ELECTRICAL TO OPTICAL LINKS USING ELECTROFORMING", having Ser. No. 07/844,027, filed of even date herewith and assigned to the same assignee, sensory unit 36 is constructed very small and light. Further, interconnect 34 is extremely small and light so that there is virtually no distracting and annoying additional weight on one side of sensory unit 36 when it is mounted on the operators head. In this specific embodiment electronic circuitry used in sensory unit 36 incorporates CMOS circuits to reduce power consumption. Power is supplied to drive display 38 and earphones 39 by means of a battery contained within sensory unit 36. The battery in sensory unit 36 is relatively small because most of the electronic circuitry, and generating apparatus is contained within driver 32, which contains a separate power source.

Figure 4:
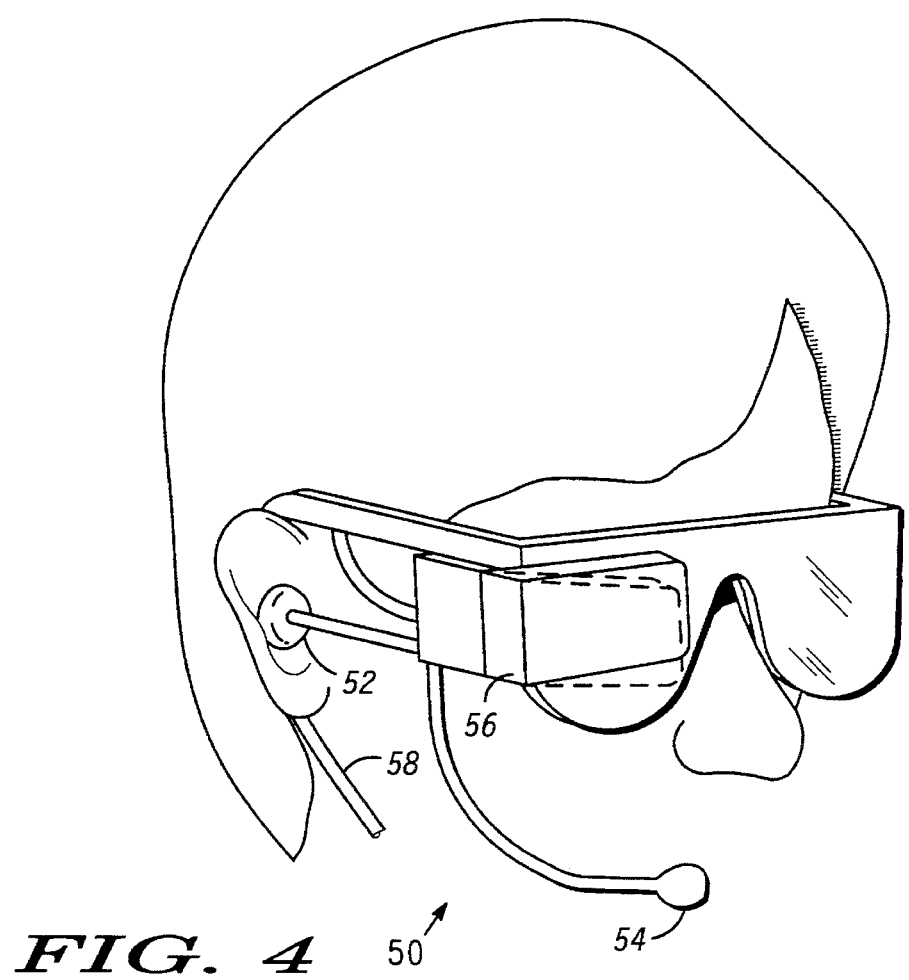
FIG. 4 is a view in perspective of a head-mounted remote sensory unit incorporating the present invention.
Figure 5:
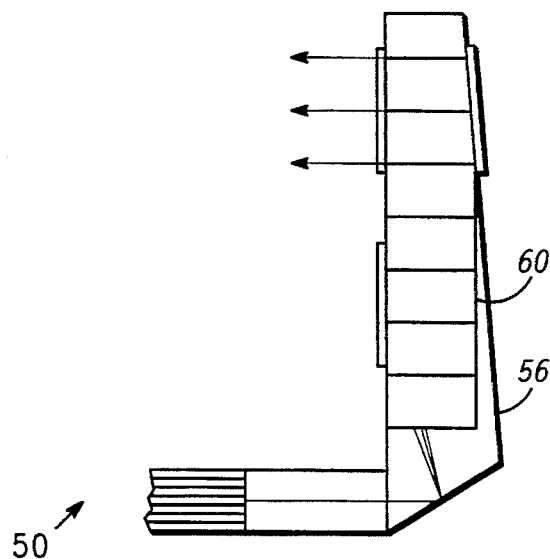
FIG. 5 is a view in top plan of the remote sensory unit of FIG. 4.

Referring specifically to FIGS. 4 and 5, another embodiment of a head-mounted sensory unit 50 embodying the present invention is illustrated. Sensory unit 50 is constructed with an appearance similar to that of remote display 10 of FIG. 1. However, sensory unit 50 includes earphones 52 and a microphone 54, in addition to a display 56. In this specific embodiment, display 56 is a display similar to display 10 described in conjunction with FIG. 1. In addition to a bundle of optical fibers carrying the virtual image for display 56, an interconnect 58 includes additional optical fibers carrying light signals for earphones 52 and microphone 54. As described in conjunction with FIG. 3, the additional optical fibers have transducers attached to the ends thereof for converting light to electrical signals and vice versa.

In the embodiment of FIGS. 4 and 5, power for the operation of earphones 52 and microphone 54 is supplied by solar cells 60 mounted on an upper surface of display 56. As is well known in the watch and calculator fields, solar cells are adequately energized by common light sources used in the work place, homes, etc. Further, solar cells 60 are extremely light and add very little weight to sensory unit 50. It will of course be understood that display 56 might be the type disclosed in conjunction with FIG. 3, rather than the type disclosed in conjunction with FIG. 1, and solar cells 60 would provide the extra power required.

Figure 6:
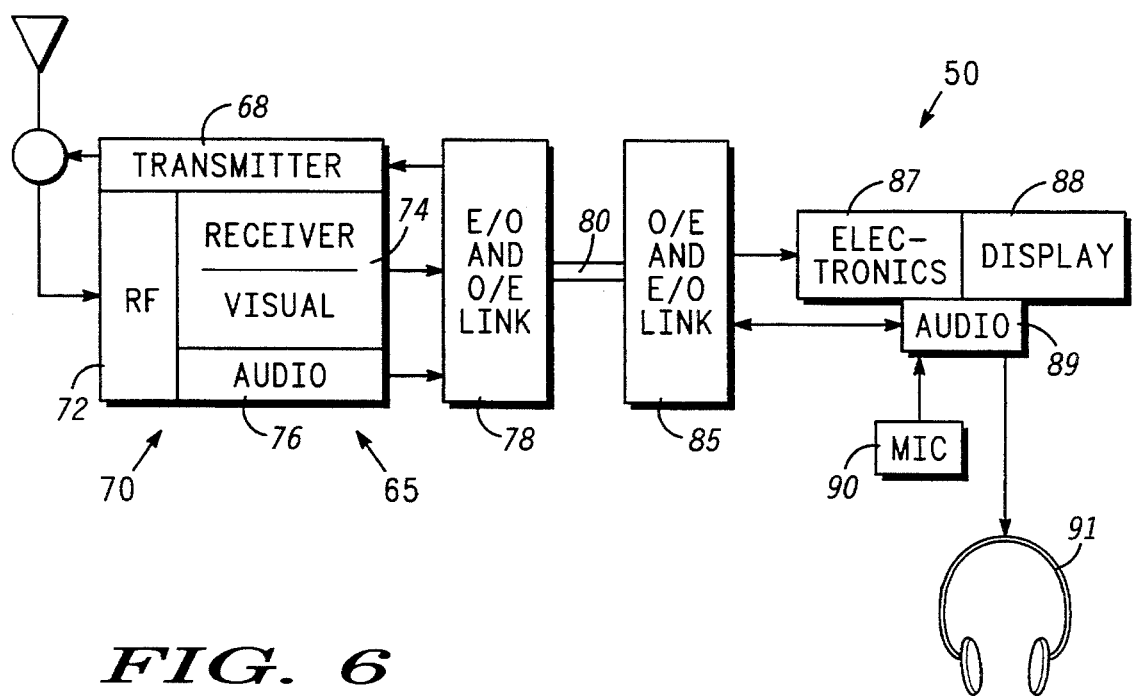
FIG. 6 is a block diagram of the remote sensory unit and transceiver of FIG. 4.

Referring to FIG. 6, a block diagram of head-mounted sensory unit 50 and an associated transceiver 65 is illustrated. In this embodiment, transceiver 65 is the driver that controls sensory unit 50. Transceiver 65 includes a transmitter 68 and a receiver 70 including an RF section 72, a visual section 74, an audio section 76 and a transducer section 78. Optical fibers 58 communicate between transducer section 78 in transceiver 65 and a transducer section 85 in sensory unit 50. Besides transducer section 85, sensory unit 50 includes an electronics section 87, a display 88, an audio section 89, microphone 54 and earphones 52.

Transducer section 78 in transceiver 65, optical fibers 58 and transducer section 85 in sensory unit 50, which form a complete optical link, are constructed as a single unit in accordance with the two patent applications described above. In this fashion the optical link is very small with the transducer sections 78 and 85 being approximately the same diameter as the optical fibers 58. By forming electronics section 87 on a CMOS integrated circuit, for example, and display 88 as a LED or FED array, or a laser based display, the entire sensory unit 50 is very small and light. Because the integrated circuit is the CMOS type, it requires less power. Power is supplied to sensory unit 50 by way of optical fibers 58 which, at the present time, is relatively inefficient. However, it will be understood from the above disclosure that power can be supplied by solar cells, a battery in sensory unit 50, a pair of fine wires, or any combination of the above.

Thus, remote sensory units and drivers connected by optical links have been disclosed. The remote sensory units are easily head-mounted for convenient operation. The connecting optical links are constructed extremely simple and light so that virtually no weight or inconvenience is added to the sensory units. Further, the sensory units are active, passive, or any combination of the two which fits a desired application.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A remote sensory unit and driver comprising: a remote sensory unit including a visual display having a real image generator including an array of pixels on a semiconductor chip with each pixel including at least one light generating device, the array of pixels being arranged in a regular pattern of rows and columns defining a real image on a surface of the semiconductor chip, and optics mounted adjacent the semiconductor chip for producing a viewable magnified virtual image from the real image, the optics including an optical waveguide having an inlet positioned adjacent the array of pixels for receiving the real image provided thereby and an outlet spaced from the inlet and defining the viewing aperture, the optical waveguide defining an optical path therethrough from the inlet to the outlet and constructed to transmit an image from the inlet to the outlet and optical means positioned along the optical waveguide at predetermined areas in the optical path for magnifying a real image supplied at the inlet and providing a magnified virtual image at the outlet, the optical means including a diffractive optical element, a sound transducer, and input/output means for receiving optical signals and converting the optical signals to control signals operating the visual display and sound transducer;

an optical cable including a plurality of fiber optics, the optical cable having a first and a second end with the first end being attached to the input/output means of the remote sensory unit; and a driver having optical inputs and optical outputs with the second end of the optical cable being attached thereto, the driver providing operating signals to the remote sensory unit by way of the optical cable when the driver is energized.

2. A remote sensory unit and driver as claimed in claim 1 wherein the driver includes an electronic transceiver.

3. A remote sensory unit and driver as claimed in claim 2 wherein the remote sensory unit further includes a microphone.

4. A remote sensory unit and driver as claimed in claim 3 wherein the remote sensory unit includes apparatus for mounting on the head of an operator.

5. A remote sensory unit and driver as claimed in claim 4 wherein the remote sensory unit includes a power supply with solar cells.

6. A remote sensory unit and driver comprising:

a remote visual display having an array of pixels on a semiconductor chip with each pixel including at least one light generating device and the array of pixels being arranged in a regular pattern of rows and columns for producing a real image on a surface of the semiconductor chip, and including an optical waveguide having an inlet positioned adjacent the array of pixels for receiving a real image provided thereby and an outlet spaced from the inlet and defining the viewing aperture, the optical waveguide defining an optical path therethrough from the inlet to the outlet and constructed to transmit an image from the inlet to the outlet, and optical means positioned along the optical waveguide at predetermined areas in the optical path for magnifying a real image supplied at the inlet and providing a magnified virtual image at the outlet, the optical means including a diffractive optical element, the visual display further including input/output means for receiving light signals and converting the light signals to the real image, the input/output means of the visual display including transducers for converting at least some light signals received from a driver into electrical signals for controlling the electronic display;

an interconnect including a plurality of fiber optics having first and second ends, the first end being attached to the visual display; and a driver having input/output means with the second end of the interconnect attached thereto, the input/output means of the driver including transducers for converting electrical signals generated by the driver into light signals for controlling the electronic display, the driver providing operating signals including the generated light signals to the display by way of the interconnect when the driver is energized.

\* \* \* \* \*